United States Patent [19]

Tomlinson

[11] Patent Number: 4,915,852
[45] Date of Patent: Apr. 10, 1990

[54] OIL FILTER ASSEMBLY FOR A VOLKSWAGEN FLAT FOUR OPPOSED CYLINDER AIR COOLED ENGINE

[76] Inventor: Robert A. Tomlinson, 28813 Farmersville, Farmersville, Calif. 93223

[21] Appl. No.: 336,825

[22] Filed: Apr. 12, 1989

[51] Int. Cl.$^4$ .............................................. B01D 37/00
[52] U.S. Cl. ..................... 210/805; 210/130; 210/168; 210/DIG. 13; 123/196 A; 184/6.24
[58] Field of Search ...................... 210/130, 168, 416.5, 210/450, 451, 457, 805, DIG. 13; 123/196 A, 196 AB, 198 R; 184/6.24

[56] References Cited

U.S. PATENT DOCUMENTS 2,372,286  3/1945  Mieras ................................. 184/6.24
3,707,202  12/1972  Dixon .................................... 210/168
3,773,144  11/1973  Hummel ............................ 123/196 A Primary Examiner—Richard V. Fisher
Assistant Examiner—Matthew O. Savage
Attorney, Agent, or Firm—Bruce & McCoy

[57] ABSTRACT

An oil filter assembly for a Volkswagen flat four opposed cylinder air cooled engine including an external oil sump secured to the oil drain hole of the engine oil pan and containing an open-sided inflow canister-type oil filter disposed therein. The oil filter assembly includes an open sided inflow canister type oil filter disposed in the external oil sump, a seal for sealing the top of the oil filter to the engine oil pick up tube, a bypass valve disposed in the bottom of the oil filter, spring means bearing against the bypass valve so as to urge the bypass valve and oil filter towards the engine oil pick up tube, and a cover plate forming the bottom of the external oil sump and bearing against the spring means.

4 Claims, 2 Drawing Sheets

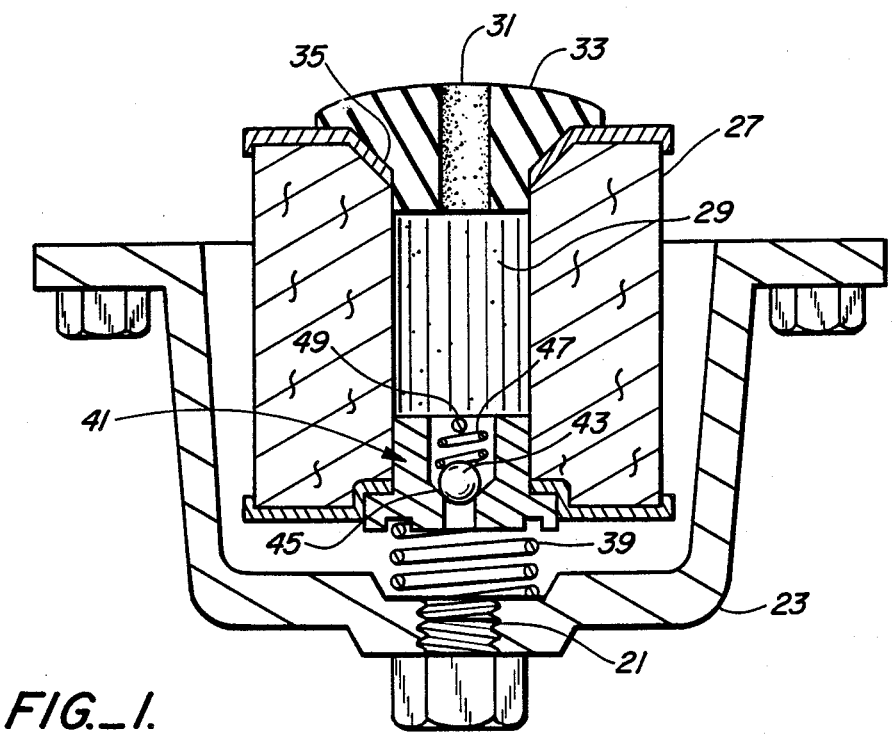
FIG._1.
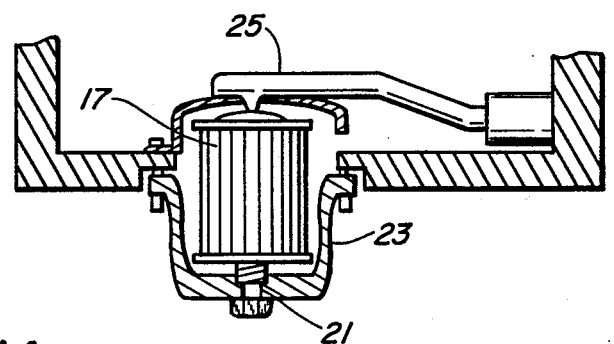
FIG._1A.

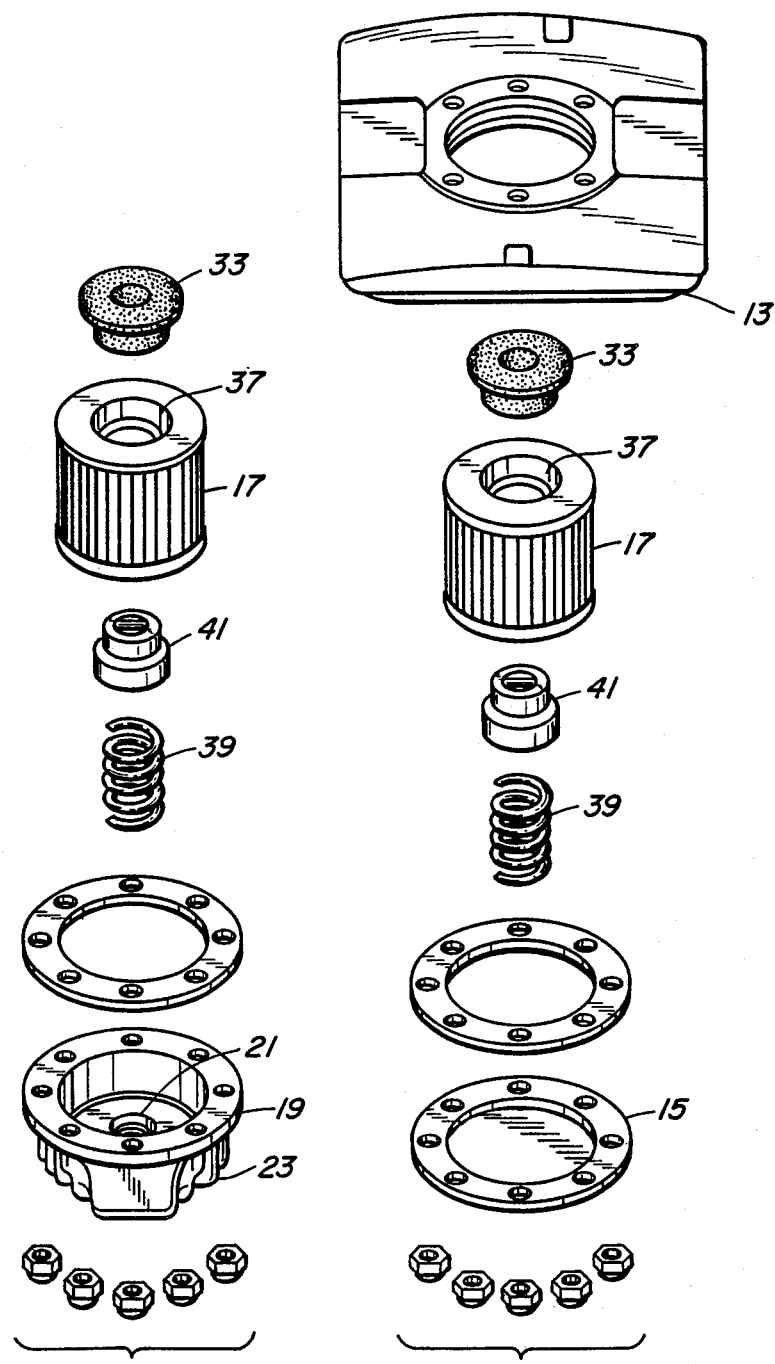
FIG._2.   FIG._3.

OIL FILTER ASSEMBLY FOR A VOLKSWAGEN FLAT FOUR OPPOSED CYLINDER AIR COOLED ENGINE

BACKGROUND OF THE INVENTION

1. Field of the Invention

The present invention relates to oil filters and more particularly to an oil filter assembly for a Volkswagen flat four opposed cylinder air cooled engine.

2. Description of the Prior Art

Oil filters have been utilized on engines and particularly on automobile engines for a long period of time. On older design automobile engines initially manufactured without an oil filter, it was usually possible for the manufacturer to redesign the engine to adapt an oil filter to the engine crankcase at some convenient location proximate the oil pan. This modification allowed standard enclosed canister oil filters to be secured directly to the automobile engine for filtering the oil on all subsequently manufactured designs and modification of the original engine.

In some older engine designs, in which it is desirable to retrofit an oil filter to the engine with after-market accessories, it is sometimes possible to adapt an oil filter assembly to the existing internal oil flow system by external connections or to tap into the crankcase or engine oil pan and siphon off a portion of the oil flow and run it through the filter. It is, of course, preferable to employ the prior option and interpose the oil filter into the full flow of oil volume and filter all of the oil constantly as it circulates through the engine. However, it is usually difficult if not impossible to do so if the engine oil flow or circulation system was not originally designed to include an oil filter, and it is an especially difficult problem to try and filter the full oil flow and keep the oil filter external to the engine for easy removal and replacement. The less desirable option when adding an oil filter to an engine not designed to utilize one is the alternative in which a portion of the oil flow is tapped off and circulated through a filter. It is easier in this design alternative to mount the oil filter in a separate container mounted close to the engine and run the oil to and from the filter through oil lines or hoses.

As a result, most after-market modifications for supplying an engine oil filter are usually less than desirable because of the usual difficulty, or inability in most cases, to direct all of the oil flow through the filtering process. It is too difficult to place a filter directly in the engine oil circulation system if the engine has not been initially designed to employ such an oil filter. Thus, most after-market systems usually filter only a portion of the oil and hardly ever in the most desirable manner of directly filtering the oil being picked up from the oil pan by the oil pump pickup tube which delivers oil to the oil pump for pressurized delivery throughout the engine lubrication system.

The ubiquitous Volkswagen flat four opposed cylinder air cooled engine was designed back in the 1930s by Dr. Ferdinand Porsche. It did not have an oil filter designed into the system and its unique design has prevented the adaption of efficient oil filters to the engine. In fact, up through the latest models of the engine manufactured for installation in Volkswagen "Bugs," they still only utilized an oil screen surrounding the oil pump pickup tube in the engine oil pan because of the inability to design an oil filter into the system. It has long been desired to provide an oil filter for these engines but the unique compact design has frustrated almost all prior attempts at achieving this result, and all attempts at providing full flow filtering.

SUMMARY OF THE INVENTION

The present invention is an oil filter assembly for a Volkswagen flat four opposed cylinder air cooled engine. It includes an external oil sump for the engine which is secured to the oil drain hole of the engine oil pan. An open-sided, inflow canister-type oil filter is disposed in the oil sump. An oil seal is provided for sealing the engine oil pickup tube to the top of the oil filter. A bypass valve is disposed in the bottom of the oil filter, and spring means are provided which bear against the bypass valve and urge the bypass valve and the oil filter upwards toward the oil pickup tube. A cover plate is provided which forms the bottom of the sump and bears against the spring means.

This unique arrangement provides an integral oil filter assembly which connects directly to the engine oil pickup tube and provides full flow oil filtering for the engine. No other system is known which provides full flow filtering for the Volkswagen flat four opposed cylinder air cooled engines, let alone includes the oil filter internally of the oil reservoir directly attached to the intake end of the oil pump pickup tube. The resulting assembly is a unique improvement in the filtering of the oil for these particular engines which have notoriously had oil cooling problems due to the heat generated by the higher operating temperatures inherent in an air cooled engine and the small oil sump capacity resulting from the tight space restrictions of the engine design.

OBJECTS OF THE INVENTION

It is therefore an important object of the present invention to provide an oil filter assembly for a Volkswagen flat four opposed cylinder air cooled engine.

It is another object of the present invention to provide the optimum benefits of a full flow oil filter assembly for said engine utilizing a canister type oil filter.

It is a further object of the present invention to provide an oil filter assembly for said engine that positions the oil filter proximate the intake end of the engine oil pump pickup tube.

It is yet another object of the present invention to provide an oil filter assembly for said engine that is disposed directly in the oil reservoir and internal to the engine.

It is still a further object of the present invention to provide an oil filter assembly for said engine which utilizes the standard oil drain hole of the engine oil pan for attaching said oil filter assembly to said engine.

And yet another object of the present invention is to provide an oil filter assembly for said engine in which the oil filter can be changed by removing the same number of bolts as is necessary for changing the oil in said Volkswagen engine oil pan.

Other objects and advantages of the present invention will become apparent when the oil filter assembly of the present invention is considered in conjunction with the accompanying drawings.

DESCRIPTION OF THE DRAWINGS

FIG. 1 is a cross section in side elevation of the oil filter and an external sump according to a first embodiment of the invention.

FIG. 1A is a partial cross section in side elevation of the oil pan, the oil filter, and the external oil sump according to the first embodiment of the invention.

FIG. 2 is an exploded view of the first embodiment of the oil filter assembly of the present invention for said engine; and FIG. 3 is an exploded view of an alternative embodiment of an oil filter assembly of the present invention for said engine.

DESCRIPTION OF THE PREFERRED EMBODIMENT

Reference is made to the drawings for a description of the preferred embodiment of the present invention wherein like reference numbers represent like elements on corresponding views.

The oil sump in the first and alternative embodiments can take the form of two different configurations, and the two configurations each have separate benefits and can function in different ways.

FIGS. 1, 1A, and 2 illustrate the first embodiment of the oil filter assembly of the present invention designed particularly for a Volkswagen flat four opposed cylinder air cooled engine. The essential element which permits the adaption of an oil filter to the standard engine is the addition of an external oil sump which is secured to the standard oil drain hole of the engine oil pan.

In the alternative embodiment shown in FIG. 3, which for purposes of this disclosure is called a thinline sump, a relatively flat and thin additional oil reservoir 11 is secured to the bottom of said engine to the same bolts that are provided for the oil drain cover on the standard engine oil pan. This sump holds an additional volume of oil which can vary in amount depending upon the size of the sump. It can be provided with cooling fins 13 on the bottom of the sump for the purpose of heat dissipation to lower the oil temperature in the sump.

In these types of engines the oil temperatures generally run high because air cooled engines are designed to run hotter and operate at higher temperatures than are experienced in a liquid-cooled engine because the engine cooling process is less efficient. The drain hole of the oil sump is sealed by a flat cover plate 15 which also can be provided with cooling fins. The cover plate and drain hole are large enough to allow the oil filter 17 to be removed and replaced through them.

In the first embodiment, the form of oil sump shown in FIG. 2 is a generally cylindrical small volume sump 19 which is large enough to contain the oil filter 17 and also attaches directly to the oil pan of the engine in place of the standard oil drain hole cover plate provided for the engine. This sump will be referred to as the cylindrical sump. A single plug drain hole 21 can be provided at the bottom of the cylindrical sump to permit changing the oil in the sump if it is deemed unnecessary to change the oil filter at the same time. If the oil filter is to be changed in the cylindrical sump, the sump itself is removed in order to replace the filter. The cylindrical sump also can be provided with cooling fins 23 for cooling the oil as it passes through the cylindrical sump.

An open-sided inflow, canister-type oil filter 17 is disposed in these oil sumps 11 and 19. The oil filter is small enough in diameter that it can project up part way through the standard oil drain hole in the bottom of the engine oil pan as shown in FIGS. 1 and 1A to engage the end of the oil pump pickup tube 25. The filter is also small enough in diameter so that engine oil can flow down around all sides of the oil filter through the standard engine oil pan drain hole for subsequent ingestion through the sides 27 of the filter into the core chamber 29 where it is sucked up into the oil pump through the pickup tube which connects with the top 31 of the filter. Both preferred embodiments of the invention utilize the same size oil filter and provide full flow filtering.

An oil seal 33 is provided at the top of the oil filter to engage in sealing relation therewith for sealing the engine oil pickup tube intake end to the top 31 of the oil filter whereby the oil picked up from the engine sump is pulled through the filter from the outside whereby the filter is herein described as an inflow filter. The seal in its simplest form is a flexible neoprene seal having beveled sides 35 which fit within a beveled receptacle 37 formed in the top of the oil filter and is held there by upward pressure on the oil filter caused by a spring 39 holding the filter against the seal. The seal is stretched over and surrounds the end of the engine oil pump pickup tube thereby creating the seal between the filter and the tube. Generally this oil seal is a neoprene product, but it can be any other oil resistant compressible product which will serve the intended purpose of sealing the filter to the oil pump pickup tube.

A bypass valve 41 is disposed in the bottom of the oil filter to permit the flow of oil to bypass through the core of the filter if it becomes clogged. The valve ensures that the oil pickup tube is adequately supplied with the required volume of oil flow for the variable engine operation speeds.

A spring means is provided for bearing against the bypass valve and urging it and the oil filter upwards toward the oil pickup tube. In its simplest form it is a coiled spring 39 which is compressed in operating position.

A cover plate 15 and 23 is provided which forms the bottom of the sump and bears against the spring means. A gasket 43 seals the cover plate to the engine sump. In the thin line sump, the cover plate 15 provides the bearing surface for the spring means and serves as the oil drain hole plug and is secured to the oil drain hole of the thin line sump. It compresses the spring against the bypass valve 41. In the cylindrical oil sump, the cover plate 23 is formed integral to the sump body, and the spring means bears against the bottom of the sump body and is compressed against the bypass valve 41 as the sump is secured to the oil drain hole of the engine oil pan.

The present invention also contemplates the unique method of providing an oil filter assembly for a Volkswagen flat four opposed cylinder air cooled engine. It comprises the steps of: providing an oil sump secured to the engine oil pan drain hole cover plate opening; installing an open-sided inflow canister-type oil filter in the additional sump, the oil filter having an oil seal at the top end thereof for engaging the engine oil pickup tube in sealed relation and a bypass valve at the lower end thereof; and finally, compressing a spring means against the bypass valve for urging the bypass valve and the oil filter upward in the sump toward the oil pump pickup tube.

Since the present invention provides an after-market modification for flat four opposed cylinder air cooled Volkswagen engines that provides full flow oil filtering, it will be seen from the description of the preferred embodiment that all of the objects and advantages of the method and apparatus of the invention are achieved. While the preferred embodiment of the invention has been described in considerable detail herein, the invention is not to be limited to such details as have been set forth except as may be necessitated by the appended claims.

I claim:

1. The method of providing an oil filter assembly for a Volkswagen flat four opposed cylinder air cooled engine comprising providing an additional oil sump secured to an engine oil pan drain hole cover plate opening, installing an open-sided inflow canister-type oil filter in said additional sump, said oil filter having an oil seal at the upper end thereof for engaging an engine oil pump pickup tube in sealed relation, and a bypass valve at the lower end thereof, and compressing spring means against said bypass valve for urging said bypass valve and said oil filter upward in said sump toward said engine oil pump pickup tube.

2. An oil filter assembly for a Volkswagen flat four opposed cylinder air cooled engine comprising an external oil sump for said engine secured to a oil drain hole of an engine oil pan, an open-sided inflow canister-type oil filter disposed in said oil sump, an oil seal for sealing an engine oil pump pickup tube to the top of said oil filter, a bypass valve disposed in the bottom of said oil filter, spring means bearing against said bypass valve and urging said bypass valve and said oil filter upwards toward said oil pump pickup tube, and a cover plate forming the bottom of said sump and bearing against said spring means.

3. The oil filter assembly of claim 2 wherein said oil sump comprises a relatively flat and thin oil reservoir which secures to the oil drain hole of the engine oil pan, and an oil drain hole in the bottom of said external oil sump large enough to allow the oil filter to pass therethrough and said cover plate is a relatively flat plate and seals the oil drain hole of said sump.

4. The oil filter assembly of claim 2, wherein said sump is generally cylindrical in configuration and closely encloses said oil filter and secures to the oil drain hole of the engine oil pan, said cover plate being integral to said sump.

* * * * *